United States Patent
Suh et al.

(10) Patent No.: US 9,176,277 B2
(45) Date of Patent: Nov. 3, 2015

(54) OPTICAL LINKS, MANUFACTURING METHODS THEREOF, AND MEMORY SYSTEMS HAVING THE SAME

(75) Inventors: Sung Dong Suh, Seoul (KR); In Sung Joe, Seoul (KR); Seong Gu Kim, Pyeongtaek-si (KR); Kyoung Won Na, Seoul (KR); Kyoung Ho Ha, Seoul (KR); Yong Hwack Shin, Incheon (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 279 days.

(21) Appl. No.: 13/549,845

(22) Filed: Jul. 16, 2012

(65) Prior Publication Data

US 2013/0064496 A1 Mar. 14, 2013

(30) Foreign Application Priority Data

Sep. 9, 2011 (KR) .......................... 10-2011-0092203

(51) Int. Cl.
*G02B 6/12* (2006.01)

(52) U.S. Cl.
CPC .............. *G02B 6/12007* (2013.01); *Y10T 29/49* (2015.01)

(58) Field of Classification Search
CPC ........ G02B 6/12; G02B 6/26; G02B 6/12007; Y10T 29/49
USPC ........... 385/14–16, 11–14, 23, 24, 26, 27, 37, 385/43, 88, 147, 11–16
See application file for complete search history.

(56) References Cited

U.S. PATENT DOCUMENTS

| | | | | |
|---|---|---|---|---|
| 5,148,507 A | * | 9/1992 | Tanisawa | 385/41 |
| 5,502,783 A | * | 3/1996 | Wu | 385/42 |
| 5,615,051 A | * | 3/1997 | Takato | 359/790 |
| 5,627,929 A | * | 5/1997 | Vawter et al. | 385/45 |
| 6,104,210 A | * | 8/2000 | Stewart | 326/86 |
| 6,442,308 B1 | | 8/2002 | Han et al. | |
| 6,473,541 B1 | * | 10/2002 | Ho | 385/15 |
| 6,788,838 B2 | * | 9/2004 | Ho | 385/15 |
| 6,898,349 B2 | | 5/2005 | Yamauchi et al. | |
| 7,224,858 B2 | * | 5/2007 | Welch et al. | 385/14 |
| 7,340,143 B2 | * | 3/2008 | Koehl et al. | 385/131 |
| 7,444,055 B2 | * | 10/2008 | Tolstikhin et al. | 385/131 |
| 7,519,246 B2 | * | 4/2009 | Welch et al. | 385/14 |
| 7,532,784 B2 | * | 5/2009 | Tolshikhin et al. | 385/14 |
| 7,689,075 B2 | * | 3/2010 | Jenkins et al. | 385/33 |
| 7,983,318 B2 | * | 7/2011 | Hayakawa | 372/50.11 |
| 2010/0247037 A1 | | 9/2010 | Little | |

FOREIGN PATENT DOCUMENTS

| | | | | |
|---|---|---|---|---|
| JP | 10319261 A | * | 12/1998 | |
| JP | 02002014306 A | * | 1/2002 | |
| KR | 20020008455 A | | 1/2002 | |

* cited by examiner

*Primary Examiner* — Akm Enayet Ullah
(74) *Attorney, Agent, or Firm* — Harness, Dickey & Pierce, PLC

(57) ABSTRACT

An optical link may include a main optical waveguide; N sub-optical waveguides, where N is a natural number; N mode couplers, each configured to perform a mode coupling operation between the main optical waveguide and a respective one of the N sub-optical waveguide; and an optical wavelength filter connected to an output terminal of the main optical waveguide and an output terminal of each of the N sub-optical waveguides. A memory system may include a memory device, a memory controller, and the optical link. A data processing system may include the memory system and a central processing unit connected to the memory system through a bus.

5 Claims, 17 Drawing Sheets

OPTICAL LINKS, MANUFACTURING METHODS THEREOF, AND MEMORY SYSTEMS HAVING THE SAME

CROSS-REFERENCE TO RELATED APPLICATION(S)

This application claims priority from Korean Patent Application No. 10-2011-0092203, filed on Sep. 9, 2011, in the Korean Intellectual Property Office (KIPO), the entire contents of which are incorporated herein by reference.

BACKGROUND

1. Technical Field

Example embodiments may relate to optical links. Example embodiments may relate to methods of manufacturing optical links. Example embodiments may relate to memory systems having optical links. In example embodiments, optical links may output an optical signal having a uniform size by using a mode coupler.

2. Description of the Related Art

To have an optical link or an optical connection between a memory and a memory controller, a wavelength division multiplexer is generally used.

An arrayed optical waveguide is used to give path difference of an optical signal input to the wavelength division multiplexer. The arrayed optical waveguide occupies a large region in a substrate, and propagation loss occurs in an output optical signal due to the path difference.

That is, in case of a general wavelength division multiplexer, an interference pattern and a shape of an output waveguide mode have a Gaussian shape, so that a frequency response also has a Gaussian shape. When such an optical wavelength divider having a Gaussian frequency response is applied to a system, frequency change of laser diode functioning as a source of the system should be correctly controlled. When the optical wavelength divider is continuously connected in serial and used, it gradually decreases bandwidth of the frequency response, so that it may increase costs of installation and maintenance of the system

SUMMARY

In some example embodiments, an optical link may include a main optical waveguide; N sub-optical waveguides, where N is a natural number; N mode couplers, each configured to perform a mode coupling operation between the main optical waveguide and a respective one of the N sub-optical waveguide; and/or an optical wavelength filter connected to an output terminal of the main optical waveguide and an output terminal of each of the N sub-optical waveguides.

In some example embodiments, the optical link may be formed in a semiconductor substrate.

In some example embodiments, the optical link may be configured to adjust optical power output from the main optical waveguide and each of the N sub-optical waveguides according to a coupling length of each of the N mode couplers.

In some example embodiments, the N sub-optical waveguides may be alternately arranged on both sides of the main optical waveguide.

In some example embodiments, each of the N sub-optical waveguides may include a first region formed at a first distance from the main optical waveguide; a second region formed at a second distance from the main optical waveguide, where the second distance is greater than the first distance; and/or a third region for connecting the first region and the second region.

In some example embodiments, the main optical waveguide may be a straight-lined optical waveguide.

In some example embodiments, a memory system may include a memory device; a memory controller; and/or a first optical link connected between the memory device and the memory controller. The first optical link may include a first main optical waveguide configured to transmit a first optical signal output from the memory controller; N first sub-optical waveguides, where N is a natural number; N first mode couplers, each configured to perform a mode coupling operation between the first main optical waveguide and a respective one of the N first sub-optical waveguides; and/or a first optical wavelength filter connected to an output terminal of the first main optical waveguide and an output terminal of each one of the N first sub-optical waveguides.

In some example embodiments, the memory system may be a multi-chip package.

In some example embodiments, the memory system may be a System on Chip (SoC).

In some example embodiments, a data processing system may include a memory system and/or a central processing unit (CPU) connected to the memory system through a bus.

In some example embodiments, the bus may be embodied in a second optical link. The second optical link may include a second main optical waveguide configured to transmit a second optical signal output from the memory system; N second sub-optical waveguides; N second mode couplers, each configured to perform a mode coupling operation between the second main optical waveguide and a respective one of the N second sub-optical waveguides; and/or a second optical wavelength filter connected to an output terminal of the second main optical waveguide and an output terminal of each one of the N second sub-optical waveguides.

In some example embodiments, a method of manufacturing an optical link may include forming a main optical waveguide in a substrate; forming N sub-optical waveguides, adjacent to the main optical waveguide, in the substrate, where N is a natural number; forming N mode couplers, each configured to perform a mode coupling operation between the main optical waveguide and a respective one of the N sub-optical waveguide, in the substrate; and/or forming an optical wavelength filter, connected to an output terminal of the main optical waveguide and an output terminal of each one of the N sub-optical waveguides, in the substrate.

In some example embodiments, the method may further include adjusting a coupling length of each of the N mode couplers; and/or forming the N mode couplers so that a magnitude of optical power output from the main optical waveguide is equal to a magnitude of optical power output from each one of the N sub-optical waveguides.

In some example embodiments, the N sub-optical waveguides may be alternately arranged on both sides of the main optical waveguide.

In some example embodiments, the main optical waveguide may be formed in a straight line.

In some example embodiments, the optical wavelength filter may be a multimode interference filter.

In some example embodiments, a memory system may include a memory device; a memory controller; and/or the optical link. The optical link may be connected between the memory device and the memory controller.

In some example embodiments, the main optical waveguide may be configured to transmit an optical signal output from the memory controller.

In some example embodiments, the memory system may be a multi-chip package.

In some example embodiments, the memory system may be a System on Chip (SoC).

In some example embodiments, the memory controller may include a first transmitter; a first receiver; and/or a control unit connected to the first transmitter and first receiver.

In some example embodiments, the first transmitter may include a first optical modulator.

In some example embodiments, the first receiver may include a first optical demodulator.

In some example embodiments, the memory device may include a second transmitter; a second receiver; and/or a memory connected to the second transmitter and second receiver.

In some example embodiments, the second transmitter may include a second optical modulator.

In some example embodiments, the second receiver may include a second optical demodulator.

In some example embodiments, the optical wavelength filter may be a multimode interference filter.

In some example embodiments, a data processing system may include a memory system and/or a central processing unit (CPU) connected to the memory system through a bus.

In some example embodiments, the bus may be embodied in a second optical link. The second optical link may include a second main optical waveguide configured to transmit a second optical signal output from the memory system; N second sub-optical waveguides; N second mode couplers, each configured to perform a mode coupling operation between the second main optical waveguide and a respective one of the N second sub-optical waveguides; and/or a second optical wavelength filter connected to an output terminal of the second main optical waveguide and an output terminal of each one of the N second sub-optical waveguides.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
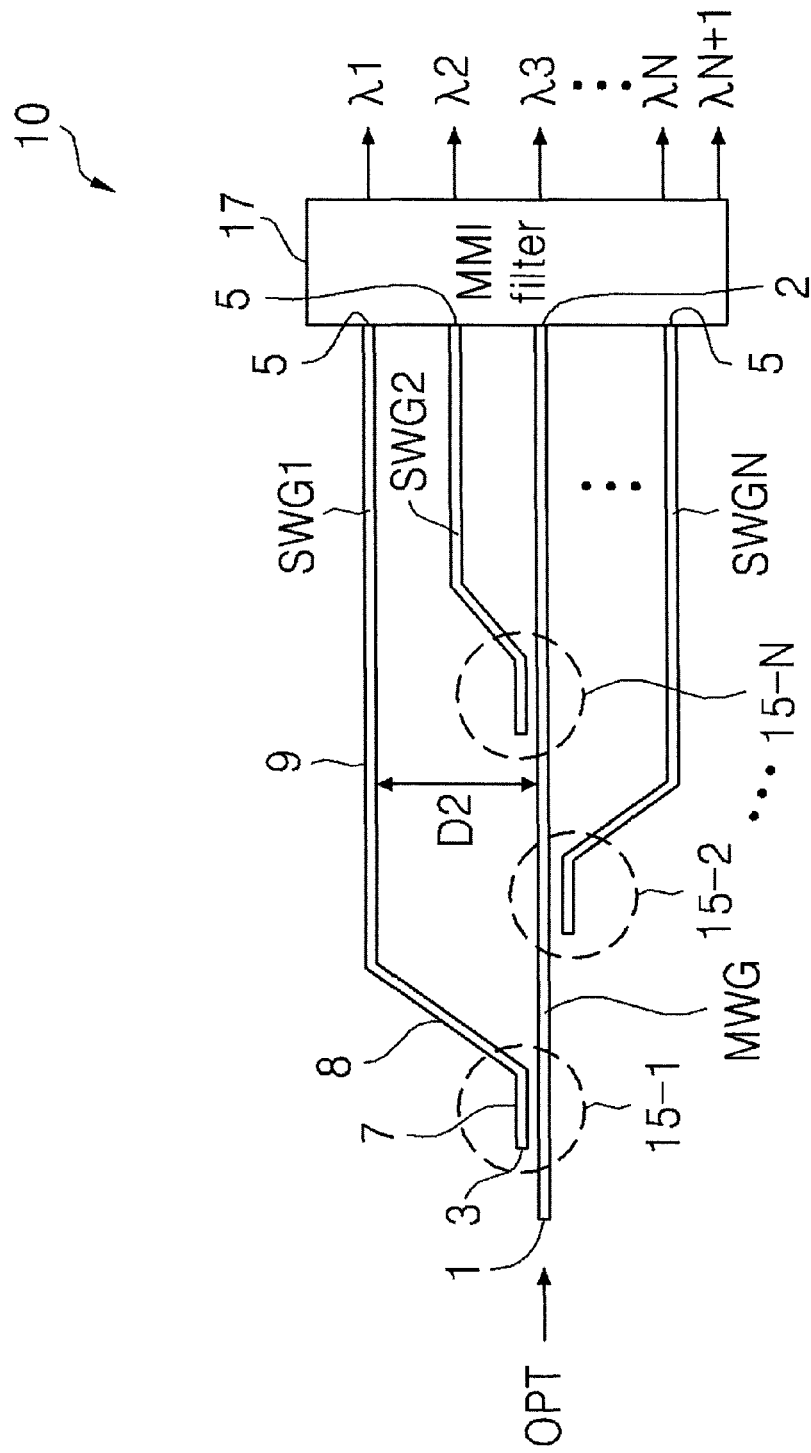
FIG. 1 is a diagram for explaining an optical link according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a diagram for explaining an optical link according to some example embodiments. Referring to FIG. 1, an optical link or optical connection device 10 includes a main optical waveguide MWG, N sub-optical waveguides SWG1 to SWGN, where N is natural number, N mode coupler 15, and an optical wavelength filter 17 (e.g., a multimode interference (MMI) filter).

The main optical waveguide MWG includes an input terminal 1, where a multiplexed optical signal OPT is input, and an output terminal 2, where an output optical signal is output.

Each of the N sub-optical waveguides SWG1 to SWGN is arranged on both sides of the main optical waveguide MWG alternately, and each optical signal ($\lambda 1$, $\lambda 2$, .. $\lambda N$: N is a natural number) split from the main optical waveguide MWG is output through an output terminal 5. Each of N sub-optical waveguides SWG1 to SWGN includes a first region 7 formed at a first distance D1 from the main optical waveguide MWG, a second region 9 formed at a second distance D2 which is farther than first distance D1 from the main optical waveguide MWG, and a third region 8 for connecting the first region 7 and the second region 9.

Figure 2:
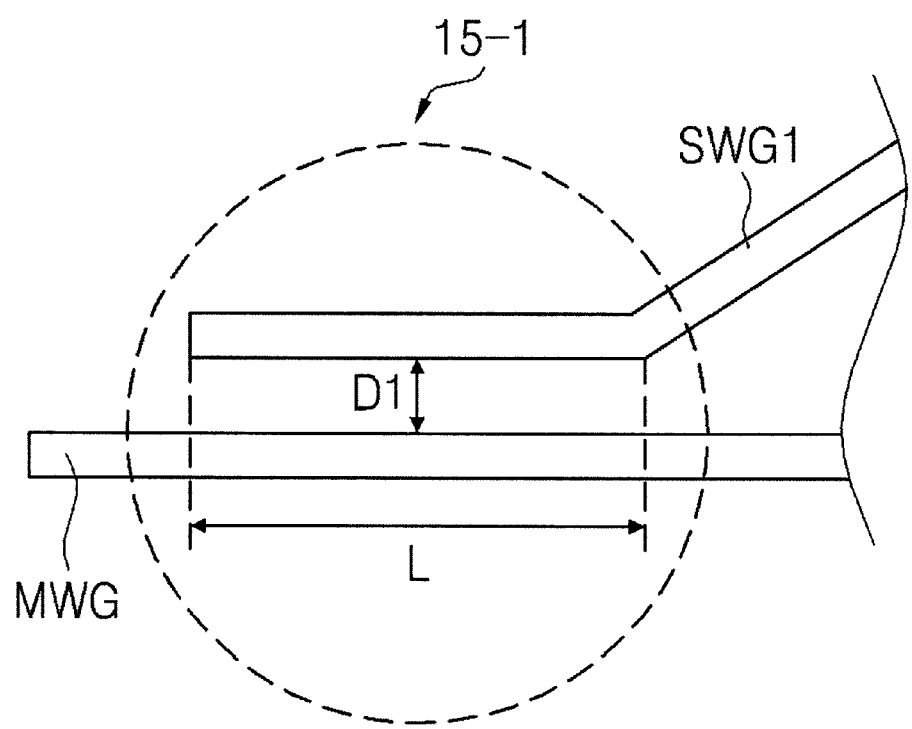
FIG. 2 is a diagram for explaining a first mode coupler illustrated in FIG. 1.

FIG. 2 is a diagram for explaining a first mode coupler illustrated in FIG. 1. Referring to FIGS. 1 and 2, each of N mode couplers (15-1 to 15-N: N is a natural number) performs a mode coupling operation between the main optical waveguide MWG and each of the N sub-optical waveguides SWG1 to SWGN. Here, each of the N mode couplers 15-1 to 15-N may be a directional coupler.

A first mode coupler 15-1 is formed on a part of the main optical waveguide MWG and a region including the first region 7 formed at a first distance D1 from the main optical waveguide MWG. Here, a first region 7 of a first sub-optical waveguide SWG1 is formed at a location where coupling efficiency is maximized by adjusting coupling length L of a part of the main optical waveguide MWG corresponding to the first region 7 of the first sub-optical waveguide SWG1 and a first distance D1 between the first region 7 of the first sub-optical waveguide SWG1 and a part of the main optical waveguide MWG.

Figure 3:
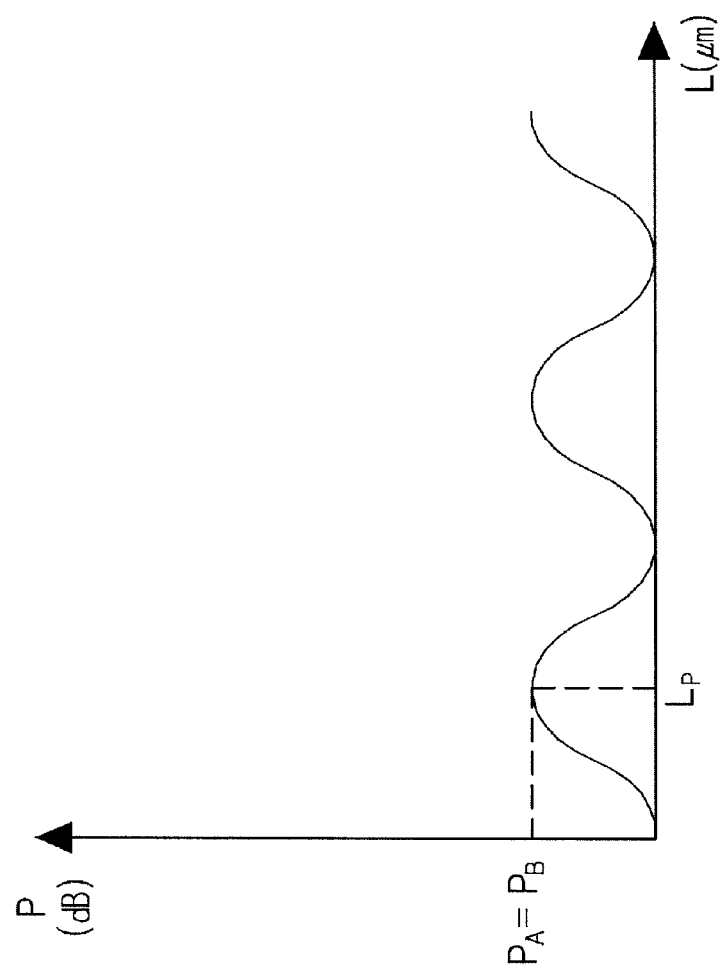
FIG. 3 is a diagram for explaining relations between optical power of an output signal of the optical link illustrated in FIG. 1 and coupling length.

FIG. 3 is a diagram for explaining relations between optical power P (dB) of an output signal of the optical link 10 illustrated in FIG. 1 and coupling length L (μm). Referring to FIGS. 1 and 3, when coupling length L, where coupling efficiency is maximized, is Lp and the coupling length L is Lp, optical power $P_A$ of an output optical signal of the main optical waveguide MWG is the same as optical power $P_B$ of each of output optical signals $\lambda 1$ to $\lambda N$ of N sub-optical waveguides SWG1 to SWGN. Accordingly, when N mode couplers 15-1 to 15-N are formed respectively to make coupling length L Lp, optical power $P_A$ and $P_B$ of each optical signal $\lambda 1$, $\lambda 2$, ..., $\lambda N$, and $\lambda N+1$ output from the optical link 10 is equalized. The optical wavelength filter 17 filters and outputs an optical signal from an output terminal 2 of the main optical waveguide MWG and each of optical signals from each output terminal 5 of N sub-optical waveguides SWG1 to SWGN.

Figure 4:
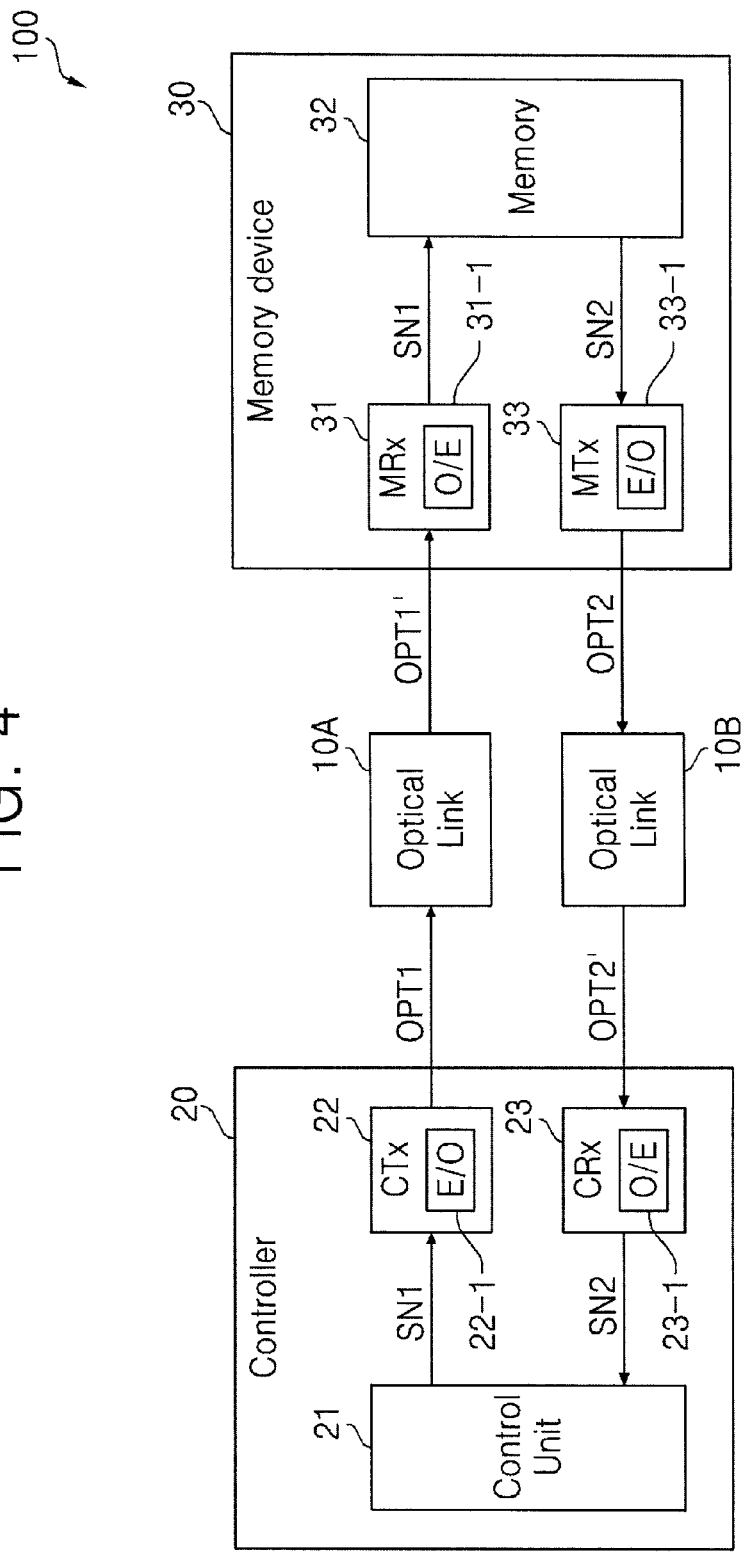
FIG. 4 is a diagram depicting some example embodiments of a memory system including the optical link illustrated in FIG. 1.

FIG. 4 is a diagram depicting some example embodiments of a memory system including the optical link illustrated in FIG. 1. Referring to FIG. 4, a memory system 100 includes a controller 20, a memory device 30 and a plurality of optical links 10A and 10B inter-connecting the controller 20 and the memory device 30. A structure of each optical link 10A and 10B is equal to a structure of the optical link 10 illustrated in FIG. 1.

The controller 20 includes a control unit 21, a first transmitter 22 and a first receiver 23. The control unit 21 transmits a control signal SN1 to the first transmitter 22.

The first transmitter 22 may include a first optical modulator 22-1, and the first optical modulator 22-1 converts a control signal SN1 which is an electric signal into a first optical transmission signal OPT1 and transmits it to the optical link 10A. The first receiver 23 may include a first optical demodulator 23-1, and the first optical demodulator 23-1 converts a second optical receiving signal OPT2' received from an optical link 10B into a data signal SN2 which is an electric signal and transmits it to the control unit 21.

A memory device 30 includes a second receiver 31, a memory 32 and a second transmitter 33.

The second receiver 31 may include a second optical demodulator 31-1, and the second optical demodulator 31-1 converts a first optical receiving signal OPT 1' received from the optical link 10A into the control signal SN1 which is an electrical signal and transmits it to the memory 32. According to a control of the control signal SN1, the memory 32 writes data or transmits the data signal SN2 output from the memory 32 to the second transmitter 33. The second transmitter 33 may include a second optical modulator 33-1, and the second optical modulator 33-1 converts the data signal SN2 which is an electric signal into a second optical transmission signal OPT2 and transmits it to the optical link 10B.

Figure 5:
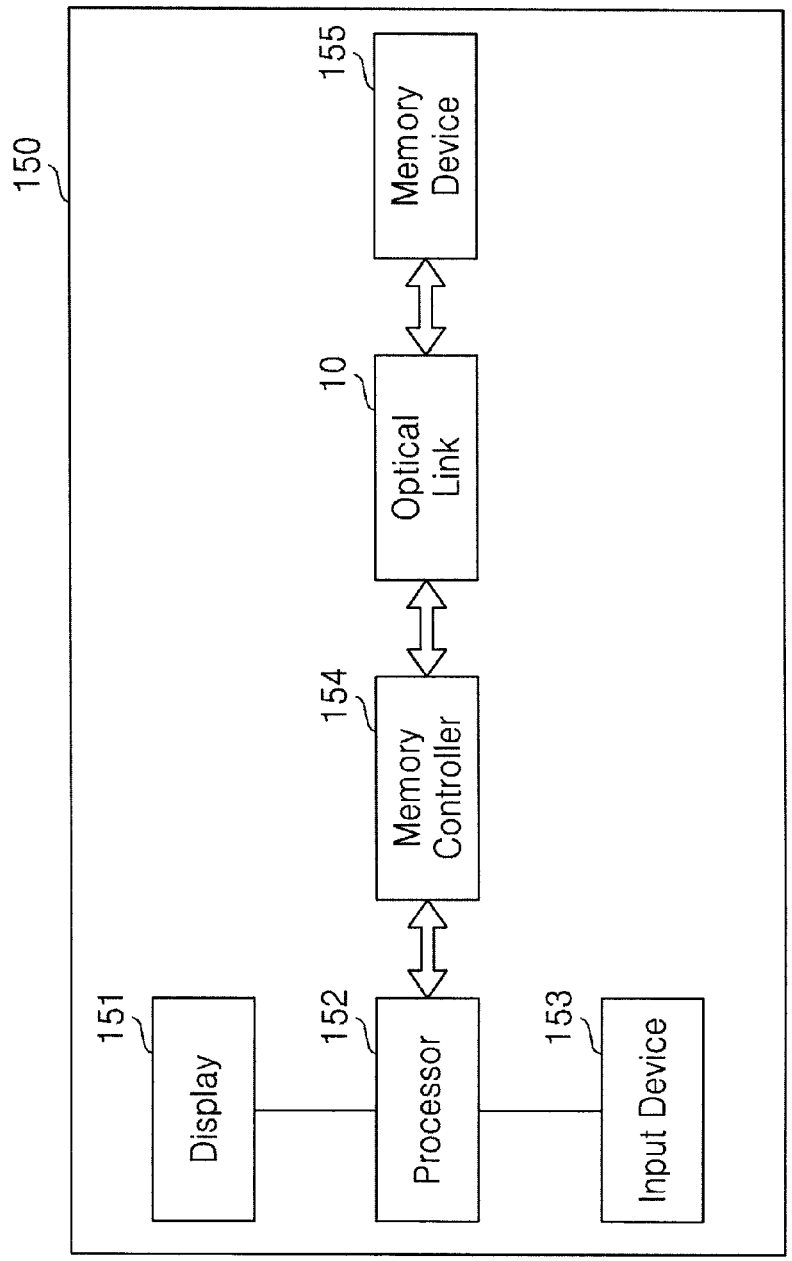
FIG. 5 is a diagram depicting some example embodiments of the memory system including the optical link illustrated in FIG. 1.

FIG. 5 is a drawing depicting some example embodiments of the memory system including the optical link 10 illustrated in FIG. 1. Referring to FIG. 5, a memory system 150, which may be embodied in a data processing device such as a tablet computer, a net-book, an e-reader, a personal digital assistant (PDA), a portable multimedia player (PMP), a MP3 player or a MP4 player, includes a memory device 155 and a memory controller 154 which may control a data processing operation of the memory device 155.

A processor 152 may display data stored in the memory device 155 through a display 151 according to an input signal from an input device 153.

The memory controller 154 may control a data access operation of the memory device 155 under a control of the processor 152.

The input device 153 may be embodied in a pointing device such as a touch pad or a computer mouse, a keypad or a keyboard. An optical link 10 transmits an optical signal output from the memory controller 154 to the memory device 155 and transmits an optical signal output from the memory device 155 to the memory controller 154. According to an example embodiment, the memory system 100 or 150 may be embodied in a multi-chip package. In addition, the memory system 100 or 150 may be a system on chip (SoC) that a system is embodied on a single chip.

Figure 6:
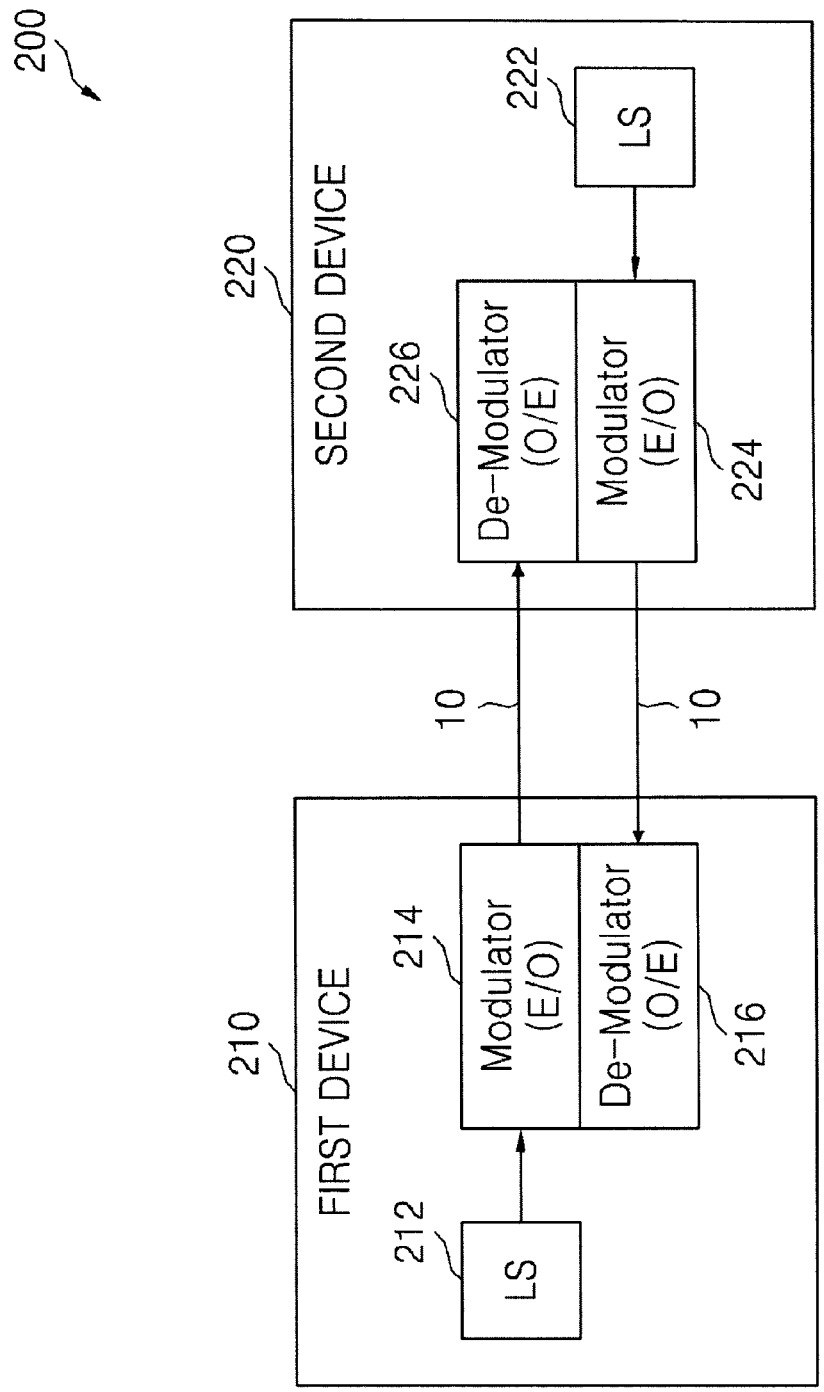
FIG. 6 is a block diagram of a data processing system according to some example embodiments including the optical link illustrated in FIG. 1.

FIG. 6 is a block diagram of a data processing system according to some example embodiments including the optical link illustrated in FIG. 1. Referring to FIG. 6, a data processing system 200 includes a first device 210, a second device 220 and a plurality of optical links 10. The first device 210 and the second device 220 may transmit or receive an optical signal through serial communication.

The first device 210 includes a first light source 212, a first optical modulator 214 which may perform an electrical to optical conversion operation, and a first optical demodulator 216 which may perform an optical to electrical conversion operation. The first light source 212 outputs an optical signal having continuous waveform. The first optical demodulator 216 receives and demodulates an optical signal output from a second optical modulator 224 of a second device 220, and outputs a demodulated electrical signal.

The second device 220 includes a second light source 222, the second optical modulator 224, and a second optical demodulator 226. The second light source 222 outputs an optical signal having continuous waveform. The optical link 10 transmits an optical signal output from the first device 210 to the second device 220 or transmits an optical signal output from the second device 220 to the first device 210.

Figure 7:
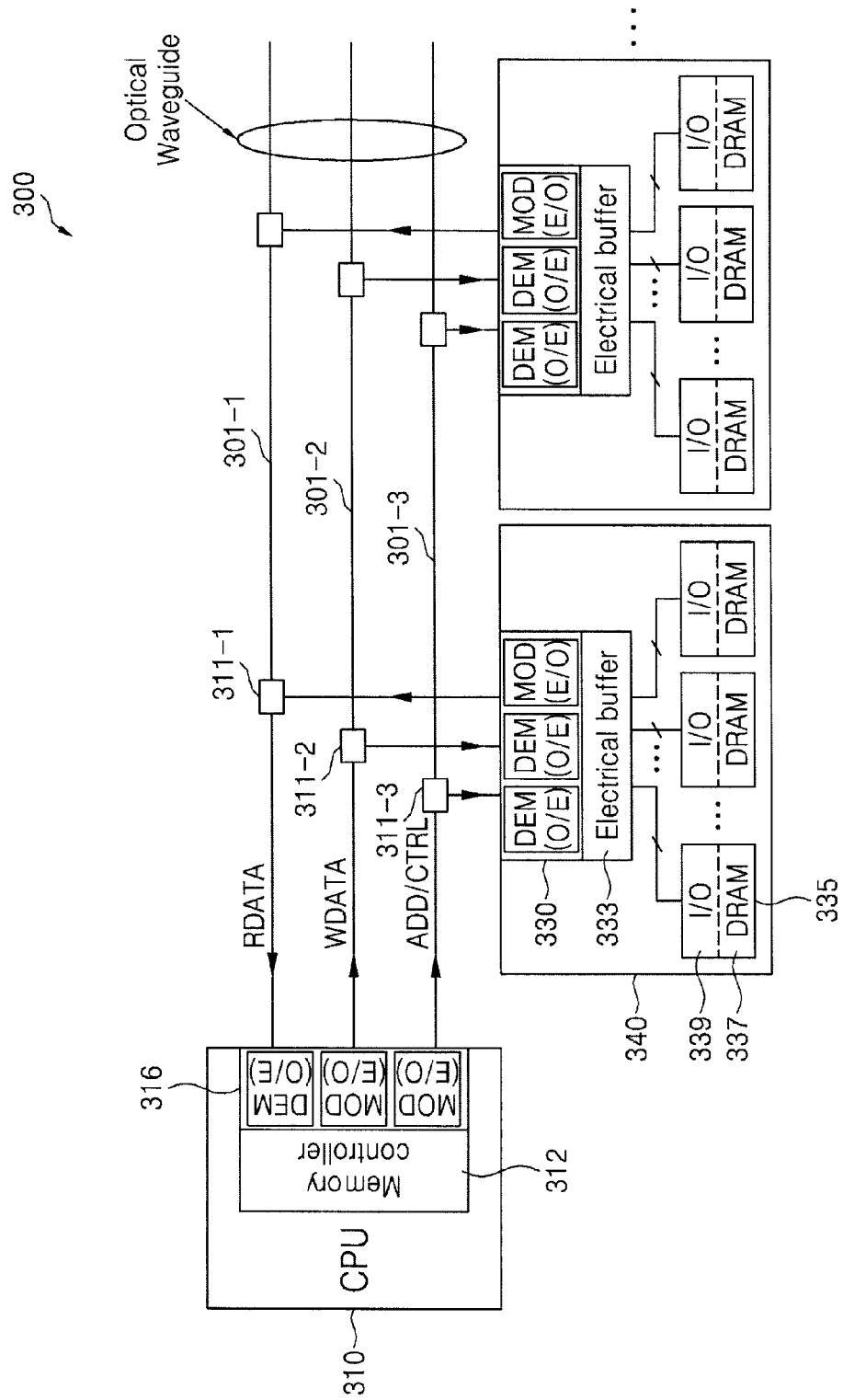
FIG. 7 is a block diagram of the data processing system according to some example embodiments including the optical link illustrated in FIG. 1.

FIG. 7 is a block diagram of a data processing system according to some example embodiments including the optical link illustrated in FIG. 1. Referring to FIG. 7, a data processing system 300 includes a CPU 310, a plurality of data buses 301-1 to 301-3 (e.g., optical communications bus), and a plurality of memory modules 340. Each of the plurality of data buses 301-1 to 301-3 is embodied in the optical link 10 illustrated in FIG. 1.

Each of the plurality of memory modules 340 transmits or receives an optical signal through each of a plurality of couplers 311-1, 311-2, and 311-3 connected to each of the plurality of data buses 301-1 to 301-3.

The CPU 310 includes a first optical transceiver 316 including at least one optical modulator MOD (E/O) and at least one optical demodulator DEM (O/E) and a memory controller 312. The at least one optical demodulator DEM (O/E) is used as an optical to electrical converter and the at least one optical modulator MOD (E/O) is used as an electrical to optical converter.

The memory controller 312 may control an operation of the first optical transceiver 316, e.g., a transmitting operation or a receiving operation, under a control of the CPU 310. After the first optical modulator MOD (E/O) of the first optical transceiver 316 transmits an optical address/optical control signal ADD/CTRL to a data bus 301-3, a second optical modulator MOD(E/O) of the first optical transceiver 316 may generate optical write data WDATA and transmit generated optical write data WDATA to a data bus 301-2.

Each memory module 340 includes a second optical transceiver 330 and a plurality of memory devices 335. Each memory module 340 may be embodied in an optical dual in-line memory module (DIMM), an optical Fully Buffered DIMM (FB-DIMM), an optical small outline dual in-line memory module (SO-DIMM), an optical Registered DIMM (RDIMM), an optical Load reduced DIMM (LRDIMM), an Unbuffered DIMM (UDIMM), an optical MicroDIMM or an optical single-in-line memory module (SIMM).

Referring to FIG. 7, an optical demodulator DEM (O/E) embodied in a second optical transceiver 330 may demodulate optical write data WDATA input through the data bus 301-2 and transmit a demodulated electrical signal to at least one of the plurality of memory devices 335.

According to an example embodiment, each memory module 340 may further include an electrical buffer 333 for buffering an electrical signal output from the optical demodulator DEM (O/E). For example, the electrical buffer 333 may buffer a demodulated electrical signal and transmit a buffered electrical signal to at least one of the plurality of memory devices 335.

Each of the plurality of memory devices 335 may include a memory array 337 including a plurality of memory cells, an access circuit 339 which may access the memory array 337, and a control logic (not shown) which may control an operation of the access circuit 339.

During a read operation, an electrical signal output from the memory device 335 is modulated to optical read data RDATA by an optical modulator MOD (E/O) embodied in the second optical transceiver 330. Optical read data RDATA are transmitted to the first optical demodulator DEM (O/E) embodied in the CPU 310 through the data bus 301-1. The first optical demodulator DEM (O/E) demodulates optical read data RDATA and transmits a demodulated electrical signal to the memory controller 312.

Figure 8:
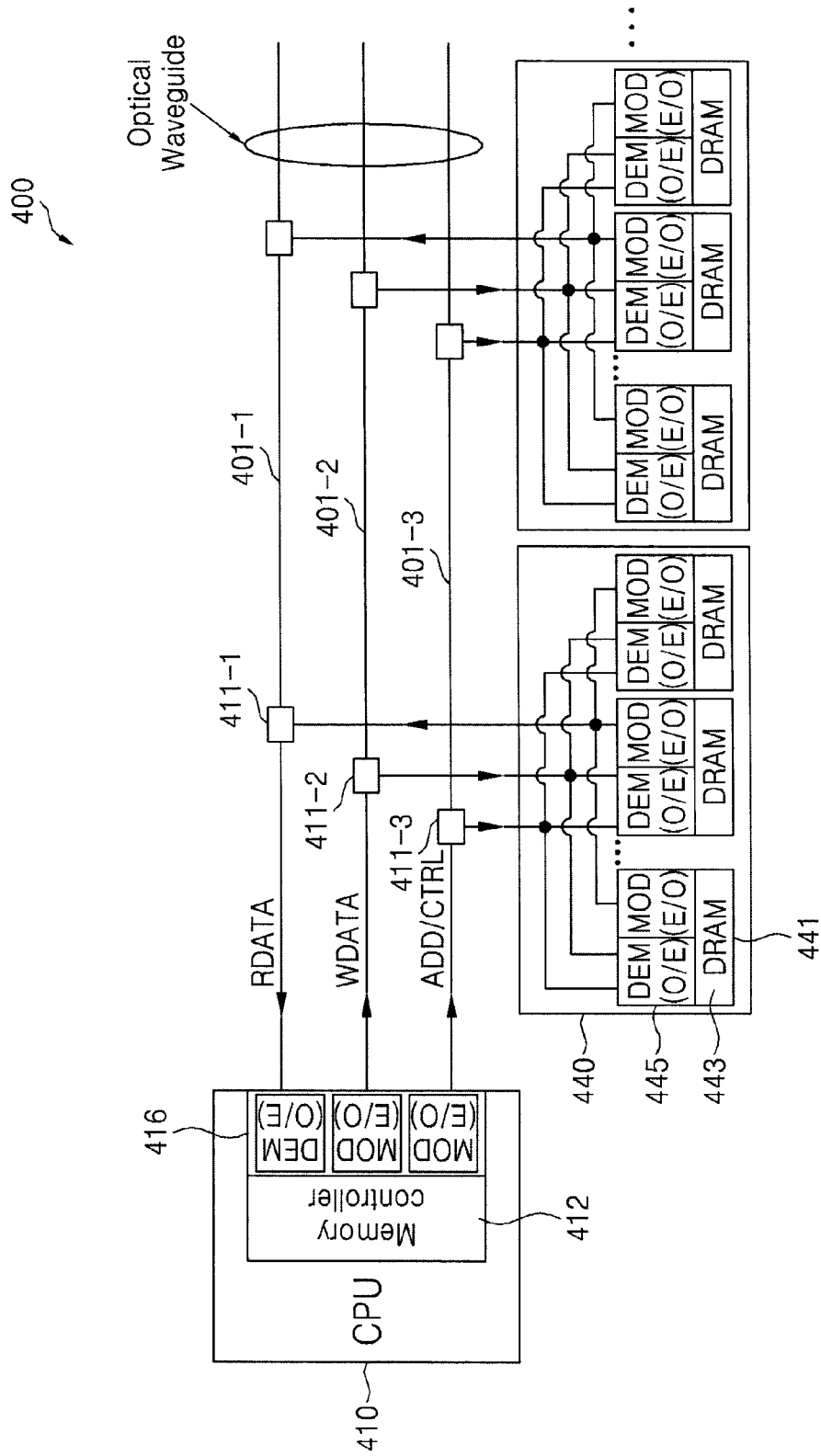
FIG. 8 is a block diagram of the data processing system according to some example embodiments including the optical link illustrated in FIG. 1.

FIG. 8 is a block diagram of a data processing system according to some example embodiments including the optical link illustrated in FIG. 1. Referring to FIG. 8, a data processing system 400 includes a CPU 410, a plurality of data buses 401-1, 401-2 and 401-3, and a plurality of memory modules 440. Each of the plurality of data buses 401-1, 401-2 and 401-3 is embodied in the optical link illustrated in FIG. 1.

Each of the plurality of data buses 401-1, 401-2 and 401-3 transmits an optical signal. Each of a plurality of memory modules 440 includes a plurality of memory devices 441 and each of the plurality of memory devices 441 includes a second optical transceiver 445. In addition, each of the plurality of memory devices 441 may include a memory array 443 including a plurality of memory cells, an access circuit (not shown) which may access the memory array 443 and a control logic (not shown) which may control an operation of the access circuit.

A write operation of the data processing system 400 is explained. First of all, it is assumed that addresses for performing a write operation and control signals ADD/CTRL are transmitted to at least one of the plurality of memory devices 441 through a corresponding data bus 401-3 in advance.

An optical modulator MOD (E/O) in a first optical transceiver 416 of the CPU 410 transmits optical write data WDATA to an optical demodulator DEM (O/E) of the second optical transceiver 445 of a first memory module 440 through an optical coupler 411-2 connected to a data bus 401-2 under a control of a memory controller 412.

An optical demodulator DEM (O/E) of the second optical transceiver 445 demodulates optical write data WDATA and generates a demodulated electrical signal. The access circuit writes the electrical signal on a memory array 443 under a control of the control logic.

A read operation of the data processing system 400 is explained. First of all, it is assumed that addresses and control signals ADD/CTRL for performing a read operation are already transmitted to one of a plurality of memory devices 441 through a corresponding data bus 401-3.

An optical modulator MOD (E/O) in the second optical transceiver 445 of the memory device 441 modulates an electrical signal output from the memory array 443 to optical read data RDATA and transmits it to an optical demodulator DEM (O/E) of a first optical transceiver 416 of the CPU 410 through an optical coupler 411-1 connected to the data bus 401-1. A first optical demodulator DEM (O/E) of the first optical transceiver 416 demodulates optical read data RDATA to an electrical signal and outputs demodulated electrical signal to the memory controller 412.

Figure 9:
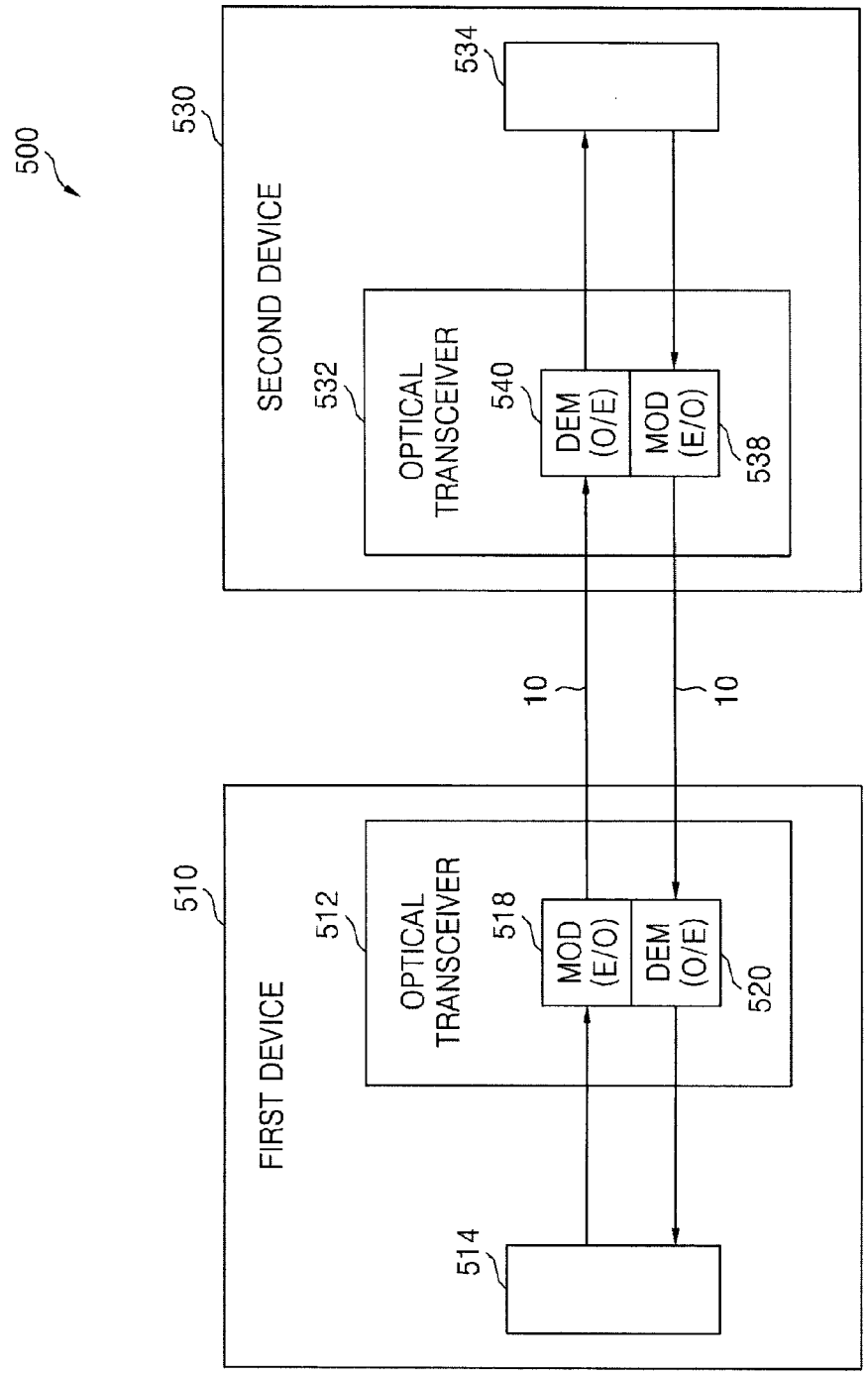
FIG. 9 is a block diagram of the data processing system according to some example embodiments including the optical link illustrated in FIG. 1.

FIG. 9 is a block diagram of a data processing system according to some example embodiments including the optical link 10 illustrated in FIG. 1.

Referring to FIG. 9, a data processing system 500 includes a first device 510, a second device 530 and an optical link 10 illustrated in FIG. 1. A first optical modulator 518 of a first optical transceiver 512 embodied in the first device 510 transmits a modulated optical signal to a second optical demodulator 540 of a second optical transceiver 532 of a second device 530 through the optical link 10 under a control of a first microprocessor 514. A second optical demodulator 540 demodulates the modulated optical signal and generates a demodulated electrical signal.

A second microprocessor 534 processes a demodulated electrical signal output from the second optical demodulator 540. For example, during a write operation, the second microprocessor 534 may write the electrical signal on a memory array.

A second optical modulator 538 of the second optical transceiver 532 of the second device 530 transmits a modulated optical signal to a first optical demodulator 520 of a first optical transceiver 512 of a first device 510 through the optical link 10 under a control of the second microprocessor 534. A first optical demodulator 520 demodulates the modulated optical signal and generates a demodulated electrical signal.

The first microprocessor 514 processes a demodulated electrical signal output from the first optical demodulator 520. For example, during a read operation, the first microprocessor 514 may process the electrical signal as read data. Each microprocessor 514 and 534 means, despite of its name, a processor which may control an operation of each device 510 and 530, e.g., a write operation or a read operation.

Figure 10:
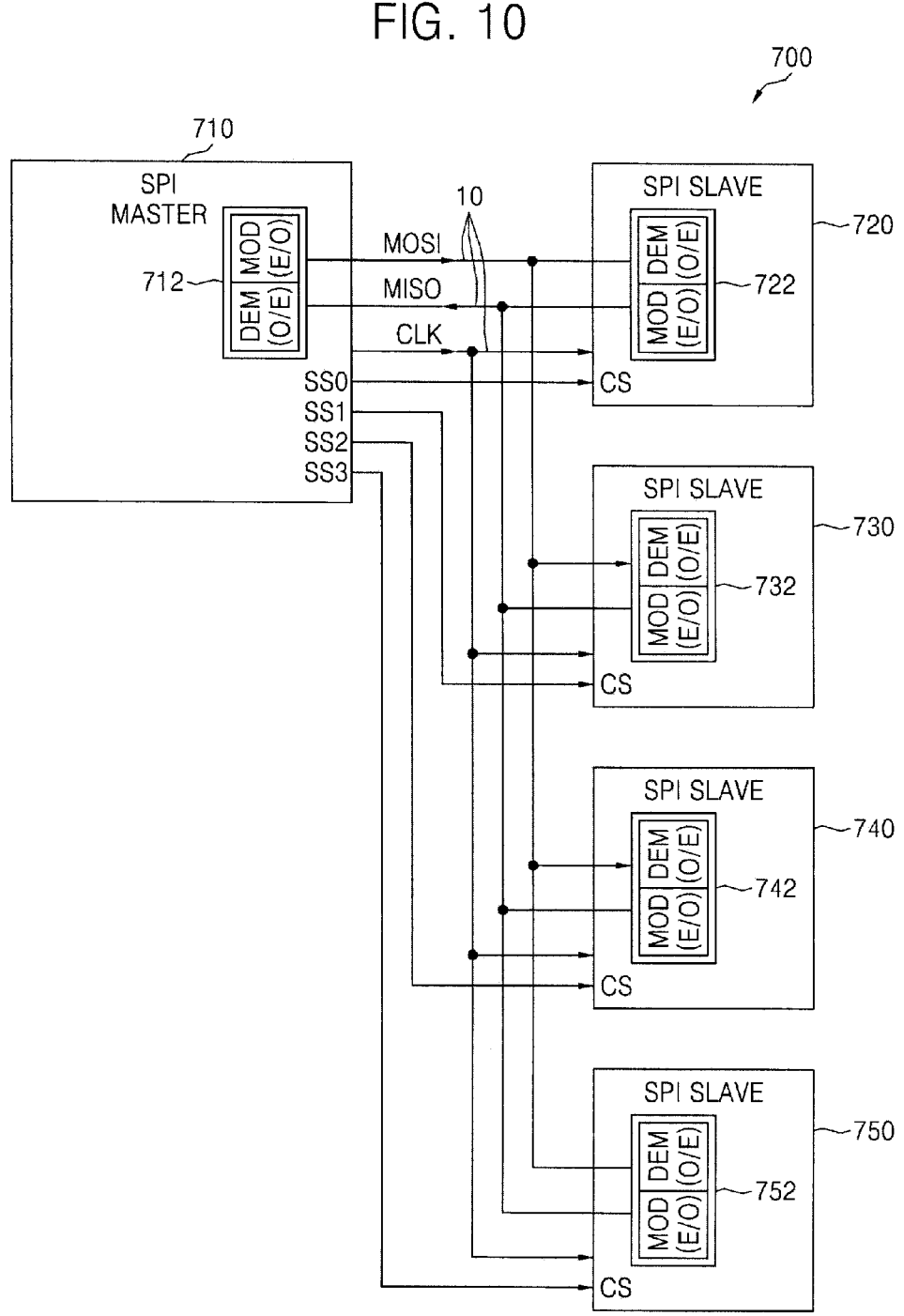
FIG. 10 is a block diagram of the data processing system according to some example embodiments including the optical link illustrated in FIG. 1.

FIG. 10 is a block diagram of a data processing system according to some example embodiments including the optical link 10 illustrated in FIG. 1. Referring to FIG. 10, a data processing system 700 which may transmit or receive serial data by using a serial peripheral interface (SPI) communication protocol includes a SPI master 710 and at least one of SPI slaves 720, 730, 740 and 750.

One of a plurality of SPI slaves 720, 730, 740 and 750 may be a shift register, a memory chip, a port expander, a display driver, a data converter, a printer, a data storage device, a sensor, or a microprocessor.

A first optical transceiver 712 and each second optical transceiver 722, 732, 742 or 752 may transmit or receive an optical signal (Master Out/Slave In (MOSI)) or Master In/Slave Out (MISO)) through a corresponding optical data bus.

The SPI master 710 includes a microprocessor (not shown) which may control an operation of the first optical transceiver 712, and each of the plurality of slaves 720, 730, 740 and 750 includes a microprocessor (not shown) which may control an operation of the second optical transceiver 722, 732, 742, or 752. In addition, the first optical transceiver 712 may transmit a serial clock signal CLK to each second optical transceiver 722, 732, 742, or 752 through an optical data bus.

Each SPI slave 720, 730, 740 or 750 may be selected by each chip selection signal SS0, SS1, SS2 or SS3. In this case, each chip selection signal SS0, SS1, SS2 or SS3 may be transmitted to each second optical transceiver 722, 732, 742 or 752 through an optical data bus. Here, each of the optical data buses is embodied in the optical link 10 illustrated in FIG. 1.

Figure 11:
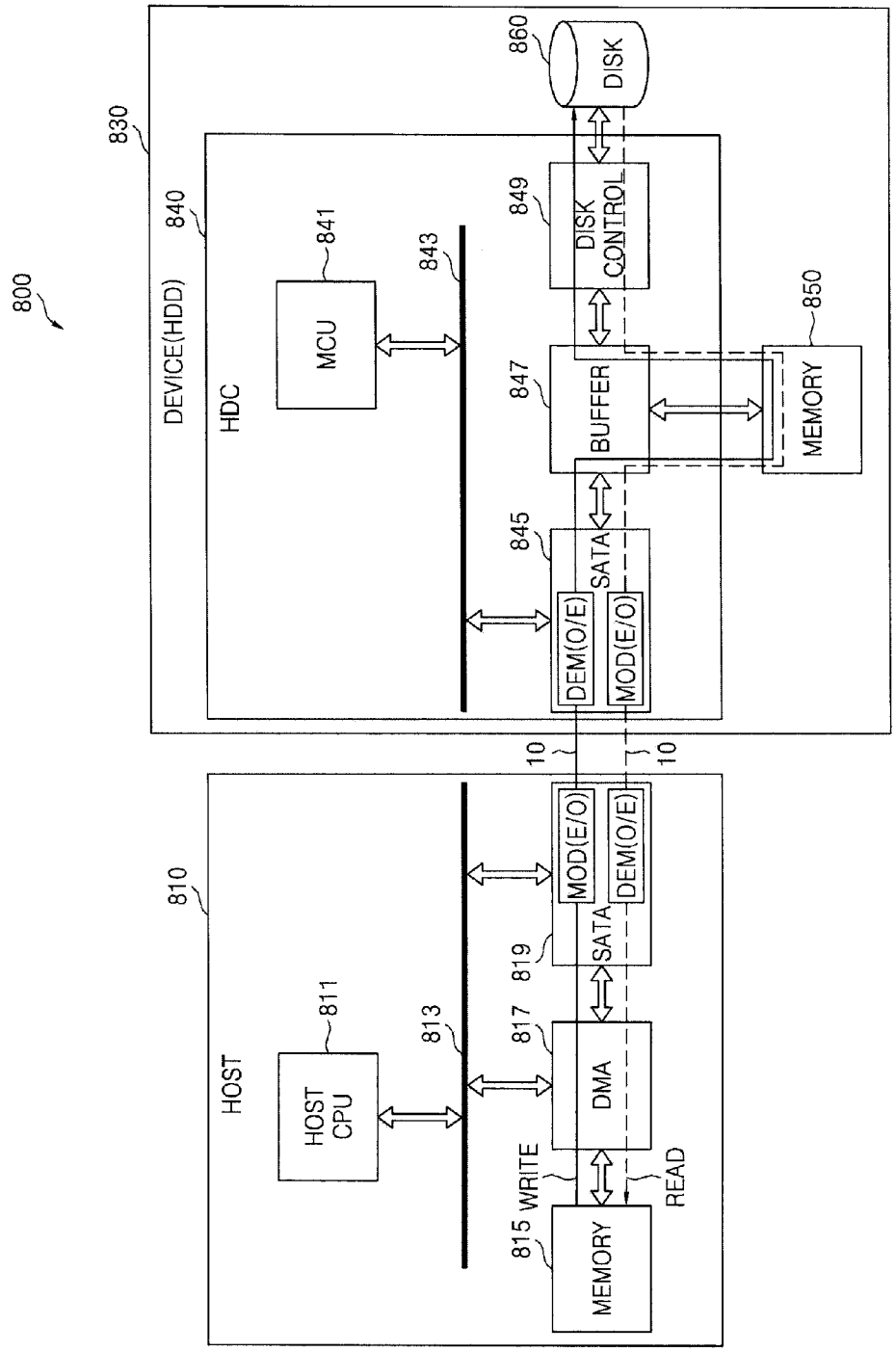
FIG. 11 is a block diagram of the data processing system according to some example embodiments including the optical link illustrated in FIG. 1.

FIG. 11 is a block diagram of the data processing system according to some example embodiments including the optical link 10 illustrated in FIG. 1. A data processing system 800 which may transmit or receive serial data by using a Serial Advanced Technology Attachment (SATA) communication protocol includes a SATA host 810 and a SATA device 830.

The SATA host 810 includes a host CPU 811, a data bus 813, a memory 815, a DMA controller 817 and a first SATA interface 819. The data bus 813 may be embodied in the optical link 10 illustrated in FIG. 1.

The host CPU 811 controls an operation of a Direct Memory Access (DMA) controller 817 or a first SATA interface 819. The first SATA interface 819 includes a first optical modulator MOD (E/O) and a first optical demodulator DEM (O/E).

The SATA host 810 may include a controller which may control an operation of the first SATA interface 819. According to an example embodiment, the controller may be embodied inside the first SATA interface 819, and the host CPU 811 may perform a function of the controller.

The SATA device 830 includes a hard disk controller (HDC) 840, a memory device 850 and a magnetic recording medium 860. The hard disk controller 840 includes a main control unit (MCU) 841, a data bus 843, a second SATA interface 845, a buffer 847 and a disk controller 849.

The MCU 841 controls an operation of at least one of the second SATA interface 845, a buffer 847 and a disk controller 849.

The second SATA interface 845 includes a second optical modulator MOD (O/E) and a second optical demodulator DEM (E/O).

The SATA device 830 may include a controller which may control an operation of the second SATA interface 845. According to an example embodiment, the controller may be embodied inside the second SATA interface 845 and the MCU 841 may perform a function of the controller.

During a write operation, write data stored in the memory 815 are transmitted to the first optical modulator MOD (E/O) of the first SATA interface 819 under a control of a DMA controller 817.

The first optical modulator MOD (E/O) generates optical write data according to the write data and transmits generated optical write data to the second optical demodulator DEM (O/E) of the second SATA interface 845 through the optical link 10.

The second optical demodulator DEM (E/O) may demodulate the optical write data to an electrical signal. The buffer 847 buffers the electrical signal and stores a buffered electrical signal in a memory device 850 temporarily. A disk controller 849 reads an electrical signal stored in the memory device 850 and writes it in a magnetic recording medium 860 designated by a write address.

During a read operation, the disk controller 849 reads data from the magnetic recording medium 860 designated by a read address and stores read data in the memory device 850 through the buffer 847.

A second modulator MOD (E/O) of the second SATA interface 845 generates optical read data according to data from the memory device 850 through the buffer 847 and transmits generated optical read data to the first optical demodulator DEM (O/E) of the first SATA interface 819 through the optical link 10.

The first optical demodulator DEM (O/E) demodulates received optical read data to an electrical signal. The DMA controller 817 stores an electrical signal demodulated by the first optical demodulator DEM (O/E) in a memory 815.

Figure 12:
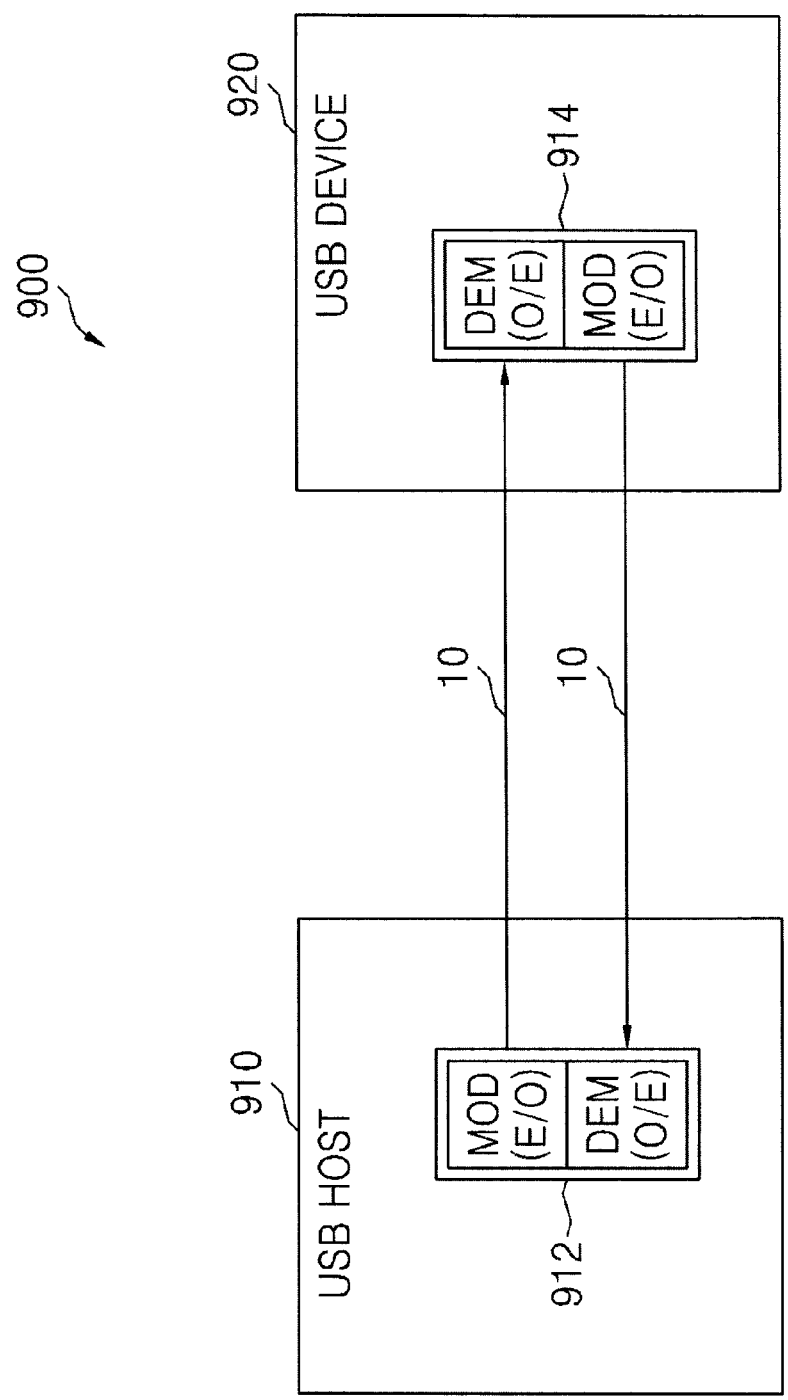
FIG. 12 is a block diagram of the data processing system according to some example embodiments including the optical link illustrated in FIG. 1.

FIG. 12 is a block diagram of the data processing system according to some example embodiments including the optical link 10 illustrated in FIG. 1.

A data processing system 900 which may transmit or receive serial data by using a Universal Serial Bus (USB) communication protocol includes a USB host 910 and a USB device 920. An optical signal generated by the first optical modulator MOD (E/O) of a first optical transceiver 912 of the USB host 910 is transmitted to the second optical demodulator DEM (O/E) of the second optical transceiver 914 of the USB device 920 through the optical link 10, and the second optical demodulator DEM (O/E) of the USB device 920 generates an electrical signal by demodulating the received optical signal.

The USB host 910 may further include a micro-controller (not shown) which may control an operation of the first optical transceiver 912. An optical signal, which is generated by the second modulator MOD (E/O) of the second optical transceiver 914 of the USB device 920, is transmitted to the first demodulator DEM (O/E) of the first optical transceiver 912 of the USB host 910 through the optical link 10, and the first optical demodulator DEM (O/E) of the USB host 910 generates an electrical signal by demodulating the received optical signal.

The USB device 920 may further include a micro-controller (not shown) which may control an operation of the first optical transceiver 912.

Figure 13:
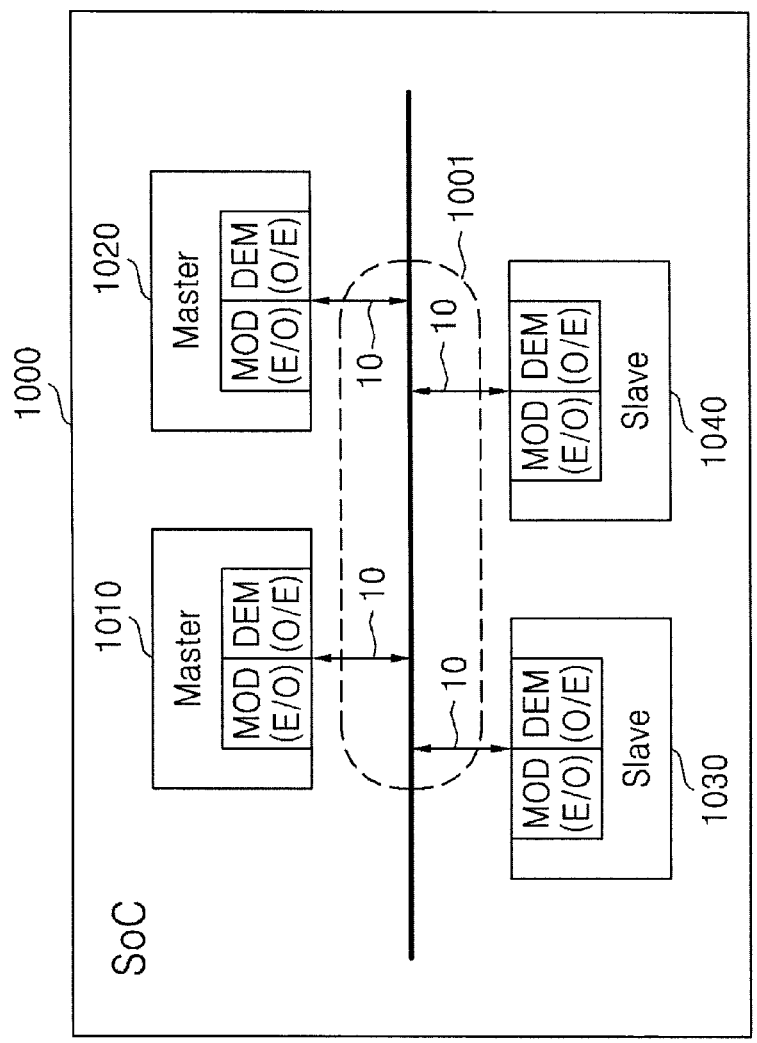
FIG. 13 is a block diagram of the data processing system according to some example embodiments including the optical link illustrated in FIG. 1.

FIG. 13 is a block diagram of the data processing system according to some example embodiments including the optical link 10 illustrated in FIG. 1. A System on Chip (SoC) 1000 illustrated in FIG. 13 includes a plurality of masters 1010 and 1020, a plurality of slaves 1030 and 1040, and a plurality of buses 1001.

Each of the plurality of masters 1010 and 1020 and each of the plurality of slaves 1030 and 1040 include an optical modulator MOD (E/O) and an optical demodulator DEM (O/E). Each of the plurality of buses 1001 is embodied in the optical link 10 illustrated in FIG. 1.

An optical signal modulated by each optical modulator MOD (E/O) is transmitted to each optical demodulator DEM (O/E) through a corresponding bus among the plurality of buses 1001 each embodied in the optical link 10, and each optical demodulator DEM (O/E) generates an electrical signal by demodulating a received optical signal.

Figure 14:
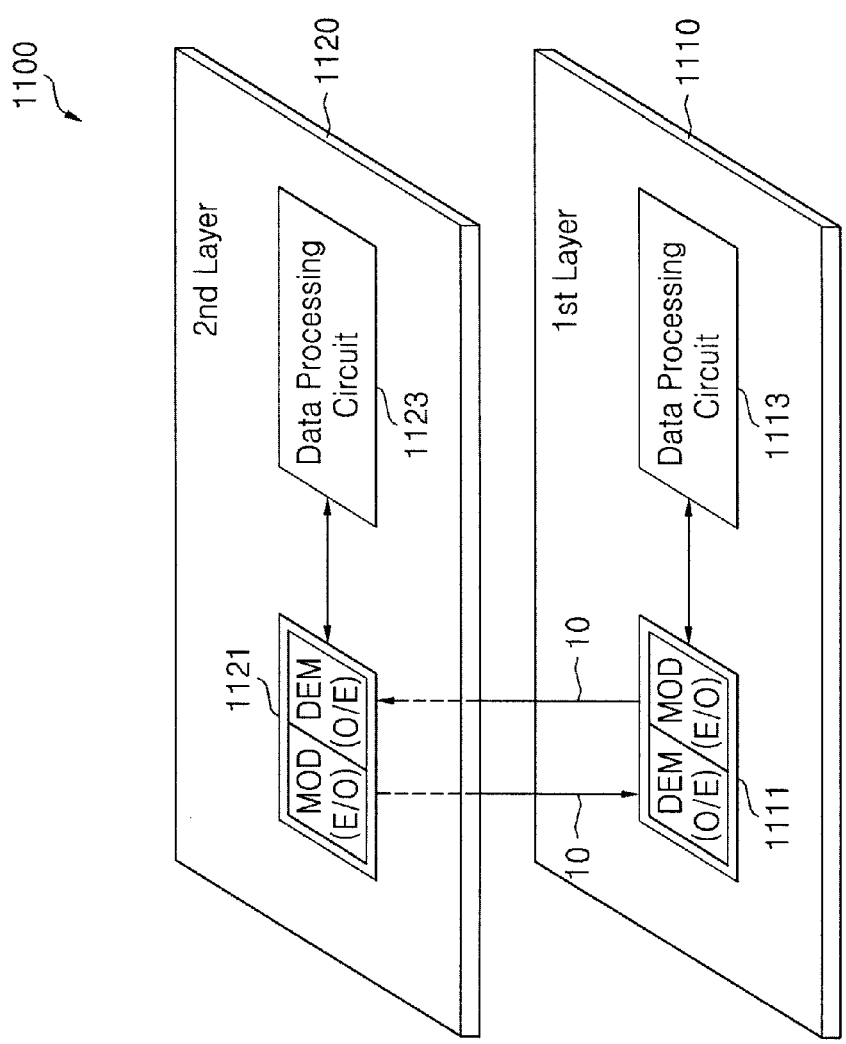
FIG. 14 is a block diagram of the data processing system according to some example embodiments including the optical link illustrated in FIG. 1.

FIG. 14 is a block diagram of the data processing system according to some example embodiments including the optical link 10 illustrated in FIG. 1. A data processing system 1100 illustrated in FIG. 14 may be formed in a stacked layer structure including a plurality of layers 1110 and 1120.

A first layer 1110 includes a first optical transceiver 1111 and a first data processing circuit 1113 which may control an operation of the first optical transceiver 1111. The first optical modulator MOD (E/O) of the first optical transceiver 1111 transmits an optical signal to the second optical demodulator DEM (O/E) of a second layer 1120 through the optical link 10. An electrical signal demodulated by the second optical demodulator DEM (O/E) is processed by a second data processing circuit 1123.

A second optical modulator MOD (E/O) of a second optical transceiver 1121 transmits an optical signal to the first optical demodulator DEM (O/E) of the first layer 1110 through the optical link 10. An electrical signal demodulated by the first optical demodulator DEM (O/E) is processed by a first data processing circuit 1113.

Figure 15:
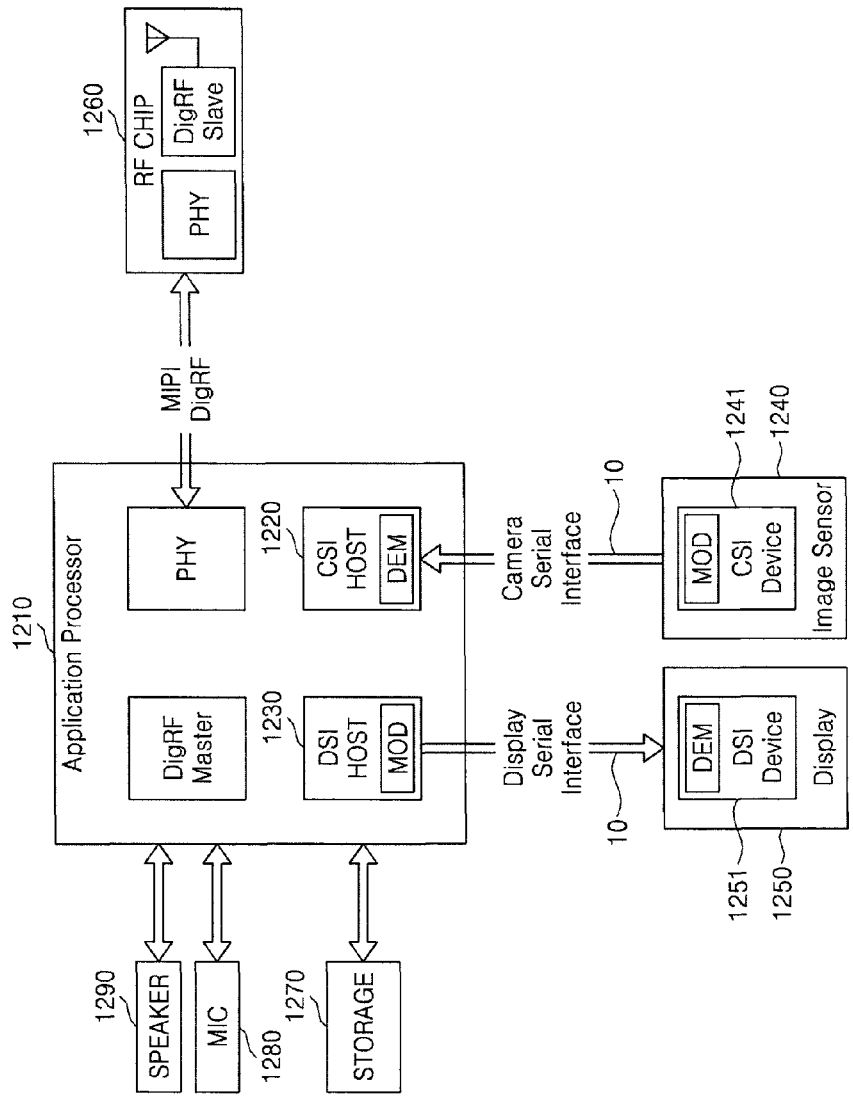
FIG. 15 is a block diagram of the data processing system according to some example embodiments including the optical link illustrated in FIG. 1.

FIG. 15 is a block diagram of the data processing system according to some example embodiments including the optical link 10 illustrated in FIG. 1. A data processing system 1200 illustrated in FIG. 15 may be embodied in a data processing device which may use or support a Mobile Industry Processor Interface (MIPI®), e.g., a mobile phone, a smart phone, a personal digital assistant (PDA), a portable media player (PMP) or a mobile communication device.

The data processing system 1200 includes an application processor 1210, an image sensor 1240, a display 1250, and an optical link 10.

A camera serial interface (CSI) host 1220 embodied in the application processor 1210 may perform serial communication with a CSI device 1241 of the image sensor 1240 through a display serial interface (DSI). For example, an optical demodulator DEM may be embodied in the CSI host 1220 and an optical modulator MOD may be embodied in the CSI device 1241. A DSI host 1230 embodied in the application processor 1210 may perform serial communication with a DSI device 1251 of the display 1250 through a display serial interface (DSI).

The display serial interface (DSI) is embodied in the optical link 10 illustrated in FIG. 1. The data processing system 1200 may further include a radio frequency (RF) chip 1260 which may communicate with the application processor 1210. Physical layer (PHY) of the data processing system 1200 and PHY of a RF chip 1260 may transmit and receive data according to MIPI DigRF. The data processing system 1200 may further include at least one of a storage 1270, a microphone 1280 and a speaker 1290.

An electrical signal used in the present invention may mean a serial electrical signal or a parallel electrical signal, and the electrical signal may mean serial data or parallel data.

Figure 16:
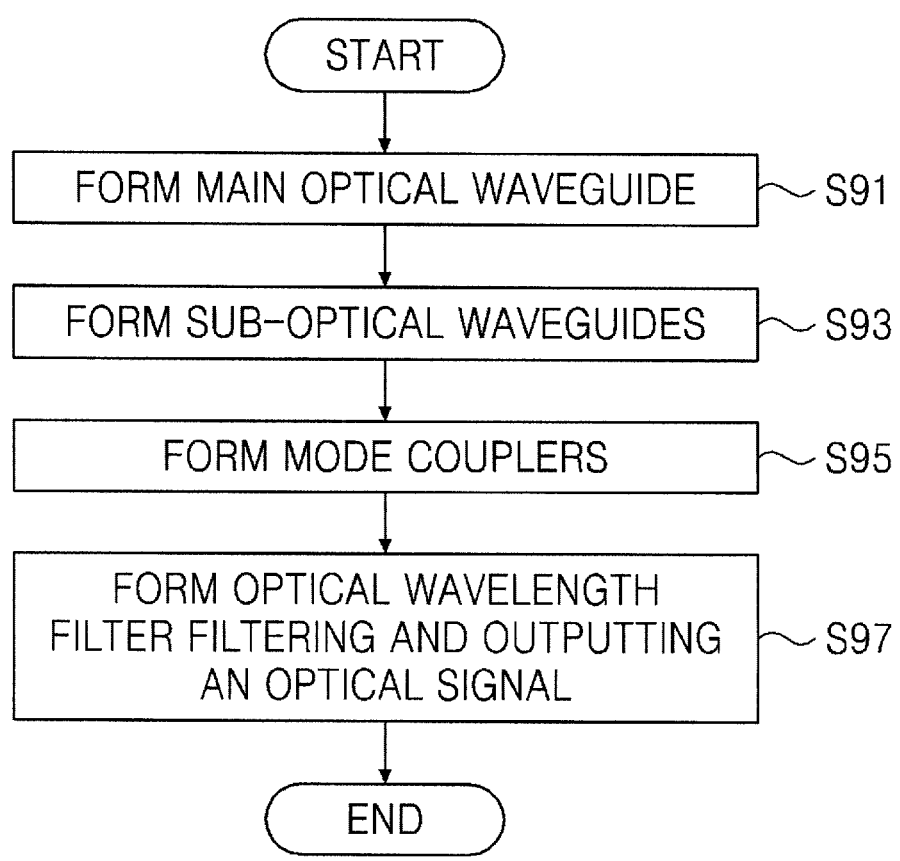
FIG. 16 is a flowchart for explaining a manufacturing method of the optical link illustrated in FIG. 1.
Figure 17:
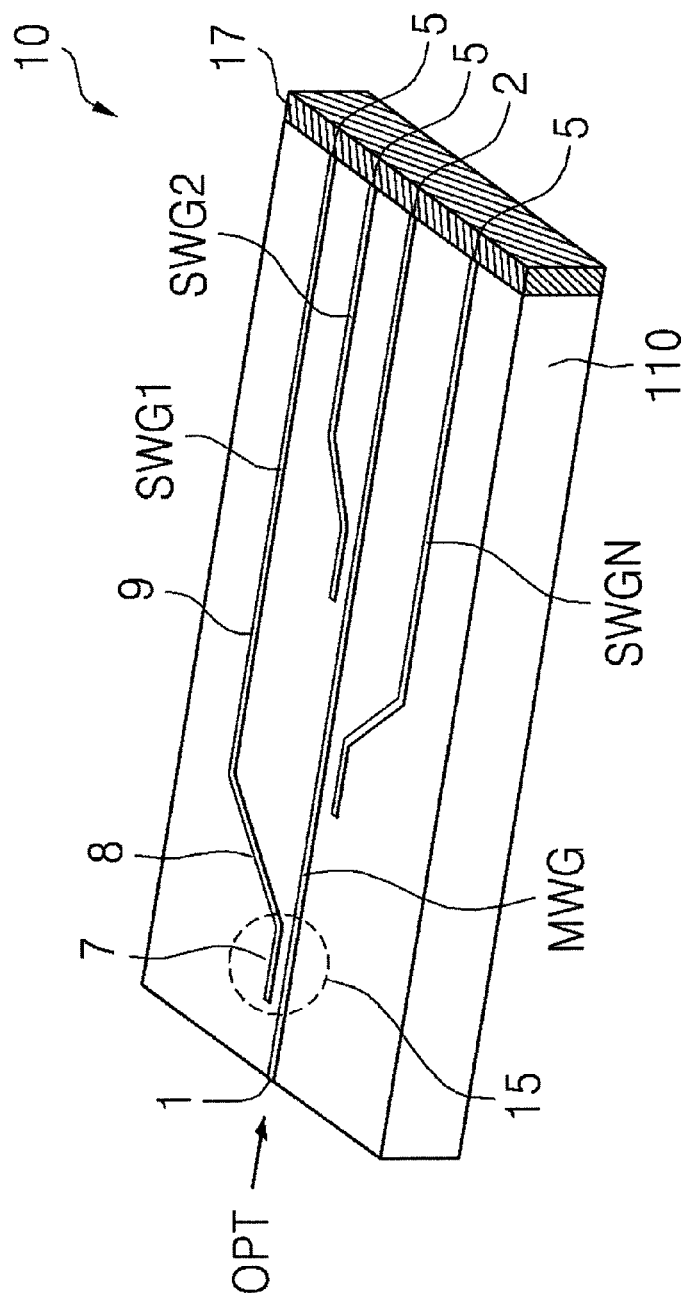
FIG. 17 is a diagram for explaining the manufacturing method of the optical link illustrated in FIG. 1.

FIG. 16 is a flowchart for explaining a manufacturing method of the optical link 10 illustrated in FIG. 1, and FIG. 17 is a diagram for explaining the manufacturing method of the optical link illustrated in FIG. 1. Referring to FIGS. 1, 16 and 17, a main optical waveguide MWG including an input terminal 1 where a multiplexed optical signal OPT is input and an output terminal 2 where an output optical signal is output is formed in a substrate 110 (S91). According to an example embodiment, a main optical waveguide may be in a straight-line.

N sub-optical waveguides SWG1 to SWGN are formed at a location adjacent to the main optical waveguide MWG (S93). According to an example embodiment, each of the N sub-optical waveguides SWG1 to SWGN is arranged on both sides of the main optical waveguide MWG by turns.

N mode couplers 15-1 to 15-N for performing a mode coupling operation are formed between the main optical waveguide MWG and each of N sub-optical waveguides SWG1 to SWGN (S95). Here, each coupling length L of the N mode couplers 15-1 to 15-N is formed in a length at which magnitude of optical power output from the main optical waveguide MWG equals to magnitude of optical power output from each of the N sub-optical waveguides SWG1 to SWGN.

An optical wavelength filter 17 which filters an output optical signal is formed by being connected to an output terminal 2 of the main optical waveguide MWG and each output terminal 5 of the N sub-optical waveguides SWG1 to SWGN (S97).

An optical link of the present invention may output an optical signal having equal magnitude by transmitting an optical signal by using a mode coupler. In addition, it may reduce an optical waveguide-occupied region, so that it may raise efficiency in design and manufacture.

While example embodiments have been particularly shown and described, it will be understood by those of ordinary skill in the art that various changes in form and details may be made therein without departing from the spirit and scope of the present invention as defined by the following claims.

What is claimed is:

1. An optical link, comprising:
    a main optical waveguide;
    N sub-optical waveguides, where N is a natural number;
    N mode couplers, each configured to perform a mode coupling operation between the main optical waveguide and a respective one of the N sub-optical waveguide; and
    an optical wavelength filter connected to an output terminal of the main optical waveguide and an output terminal of each of the N sub-optical waveguides;
    wherein each of the N sub-optical waveguides comprises,
        a first region formed at a first distance from the main optical waveguide;
        a second region formed at a second distance from the main optical waveguide, where the second distance is greater than the first distance; and
        a third region for connecting the first region and the second region.

2. The optical link of claim 1, wherein the optical link is formed in a semiconductor substrate.

3. The optical link of claim 1, wherein the optical link is configured to adjust optical power output from the main optical waveguide and each of the N sub-optical waveguides according to a coupling length of each of the N mode couplers.

4. The optical link of claim 1, wherein the N sub-optical waveguides are alternately arranged on both sides of the main optical waveguide.

5. The optical link of claim 1, wherein the main optical waveguide is a straight-lined optical waveguide.

* * * * *